Oct. 31, 1933.  E. A. SUTCLIFFE  1,932,538
GASKET
Filed Oct. 31, 1930   2 Sheets-Sheet 1
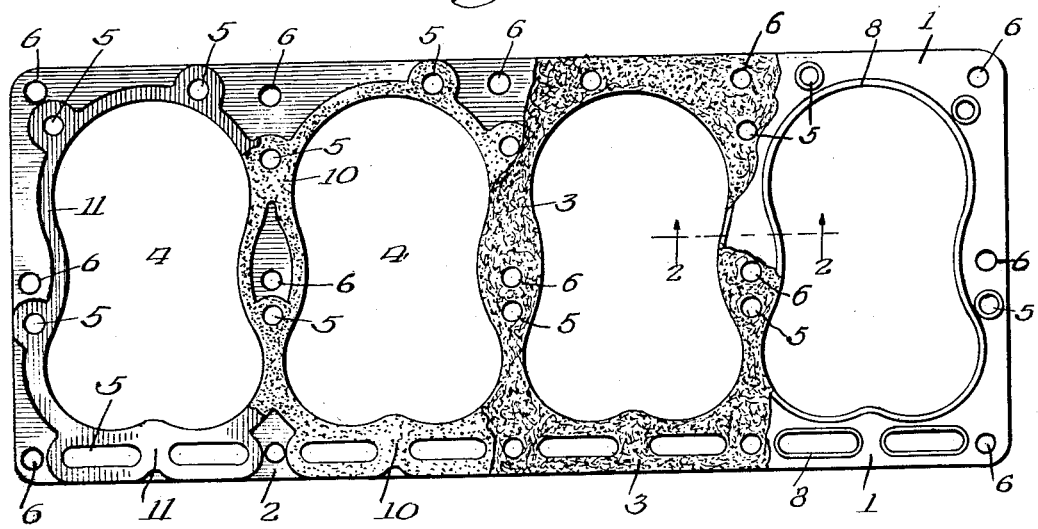
Fig. 1
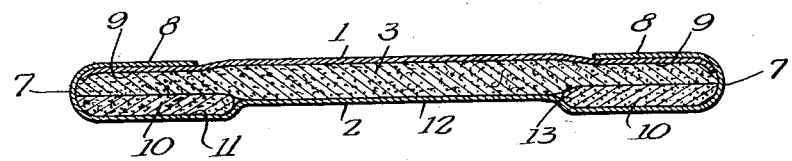
Fig. 2
Fig. 2a
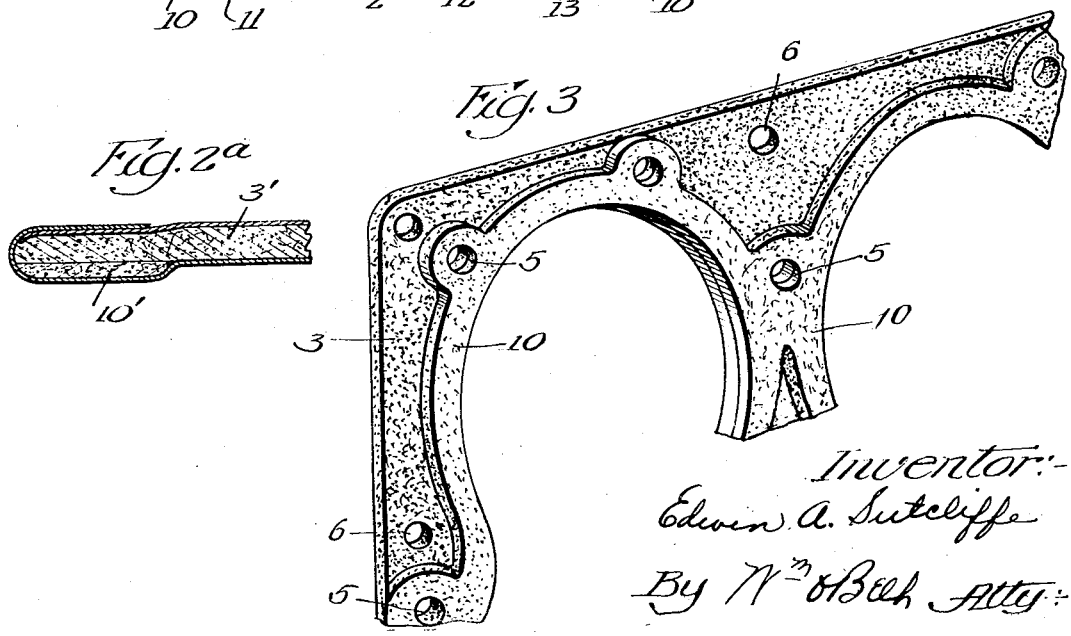
Fig. 3
Inventor:-
Edwin A. Sutcliffe
By Wm O. Belt Atty Oct. 31, 1933. E. A. SUTCLIFFE 1,932,538
GASKET
Filed Oct. 31, 1930  2 Sheets-Sheet 2
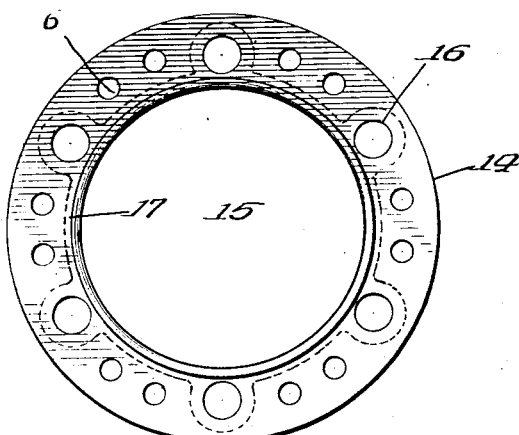
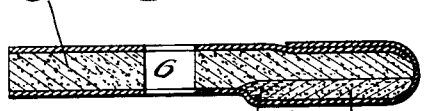
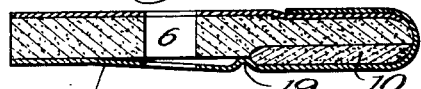
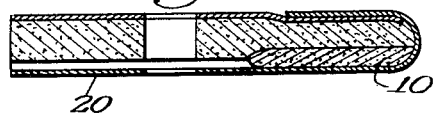
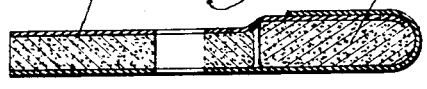
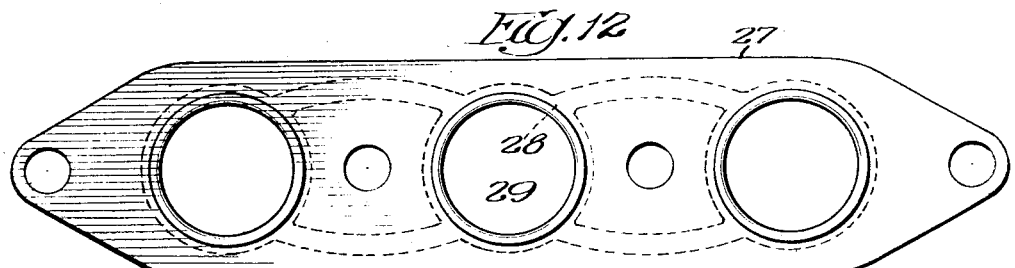
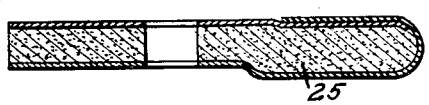
Inventor:-
Edwin A. Sutcliffe
By Wm D Bell, Atty.

Patented Oct. 31, 1933

1,932,538

UNITED STATES PATENT OFFICE 1,932,538

GASKET

Edwin A. Sutcliffe, Oak Park, Ill., assignor to Victor Manufacturing & Gasket Company, Chicago, Ill., a corporation of Illinois Application October 31, 1930. Serial No. 492,455

7 Claims. (Cl. 288—1)

This invention relates to gaskets and while it is especially adapted for cylinder head and manifold gaskets of internal combustion engines it can be embodied in and adapted for gaskets of other kinds and used with corresponding results.

The primary object of the invention is to provide a gasket which will be subjected to an excess of pressure at the marginal edges of the port openings so that it will be closely compacted under pressure sufficient to seal the joint and form a tight joint which will withstand the conditions to which gaskets are ordinarily subjected in use.

Another object of the invention is to reenforce and strengthen a gasket about the marginal edges of the port openings so as to resist the heat, pressure and other conditions to which gaskets are subjected in actual use and provide a long-lived tight-sealing gasket.

And a further object of the invention is to enlarge the cross section of a gasket at the marginal edges of the port openings to provide a seat about the port openings of greater thickness than the remaining parts of the gasket and which will thereby compress more compactly than other parts of the gasket under the pressure required to seal and form a tight seal of long-wearing quality.

In the accompanying drawings I have illustrated the invention in selected embodiments and referring thereto, Fig. 1 is a plan view of a cylinder head gasket broken away to disclose the construction thereof.

Fig. 2 is a sectional view on the line 2—2 of Fig. 1.

Fig. 2a is a detail sectional view.

Fig. 3 is a fragmentary perspective view showing the pad 10 on the asbestos layer 3.

Fig. 4 is a plan view of another type of cylinder head gasket.

Figs. 5 to 11 inclusive are detail sectional views showing different embodiments of the invention.

Fig. 12 is a plan view of a manifold gasket.

Referring first to Figs. 1-3 of the drawings, the gasket comprises metal outer layers 1, 2 and an interposed layer 3 of asbestos composition or other suitable gasket material. These layers are provided with coincident combustion port openings 4 and water port openings 5 and ordinary bolt holes 6. The metal layers 1 and 2 are interengaged at the port openings to protect the edges of these openings, and this interengagement may be effected in any suitable manner. I have shown the layer 2 provided with flanges which are projected through the port openings to form walls 7 therefor and lapped at 8 upon the marginal edges 9 of the other layer 1. Or I may provide the port openings with a united flange or with single flanges as shown, for example, in Patents 1,472,133, October 30, 1923, and 1,692,857, November 27, 1928, and I may provide the walls of some or all of the port openings with reenforce flanges according to Patent 1,748,582, February 25, 1930.

It has been the general practice heretofore to make gaskets of a substantially uniform thickness throughout except that in some cases the flange overlap has provided greater thickness. My invention may be embodied in gaskets with or without this flange overlap enlargement and it has to do primarily with the gasket material intermediate layer between the outer metal layers.

My invention has for its object to provide a seat for the gasket around some or all of the port openings of a substantial width and thickness so that when parts are tightened upon the gasket to seal a joint the marginal edges of the gasket about the port openings will be more compressed than other parts of the gasket and will thereby provide a strong and substantial gasket structure about these port openings which will effectually resist the heat, pressure and other conditions to which gaskets are subjected in service. To this end I make the heat-resisting intermediate layer of the gasket, which layer may be of any suitable gasket material, thicker at the marginal edges of the port openings than elsewhere so that the pressure required in making the joint will compress the thickened portions of the gasket to a greater extent than the other portions, thereby providing compacted, hard marginal edges about the port openings which will form a tight seal and resist the destructive conditions to which gaskets are subjected in service. I may produce this thickened margin by providing a skeleton pad 10 in a single piece, or in as many pieces as may be found convenient in manufacture, and one of the metal layers, such as 2, may be provided with a recess or recesses 11 to receive the pad. The recesses will be formed in the layer about the openings which are to be protected, such as the combustion chamber openings 4 and the water circulation openings 5, and they are preferably of a size in which the pad will fit comparatively close. Each recess constitutes a guide for the pad to retain the pad in place while the other parts of the gasket are being assembled and the gasket is being manufactured. That part of the metal layer forming the outer wall of the recess provides a shoulder 13 against which the pad abuts and this shoulder serves to brace the pad, and the asbestos layer through the contact of the pad therewith, against engine pressures in the port openings to avoid blow-outs in the gasket. The edges of the pad are preferably rounded to conform with the rounded walls 7 about the port openings and with the shoulders 13. The pad may be made of the same material as the layer 3, or of a different material; it may be made in one piece or in section; and it may be fastened to the layer 3 by adhesive or otherwise or it may be free from the layer except as it is held in contact therewith by the metal layers and by pressure in actual use.

In Fig. 4 I have shown a circular type of cylinder head gasket 14 having a cylinder port opening 15 and water circulation openings 16. This gasket has the same elements of construction as the gasket of Fig. 1, with a pad 17 about the marginal edges of the port openings.

The pad may be variously constructed and I have shown some different forms thereof in Figs. 5 to 11. The inner edge of the pad about the port openings may be rolled or otherwise compressed as indicated at 18, Fig. 5, to insure a rounded edge in the completed gasket and to produce a smooth shoulder 13 on the metal layer adjacent thereto. I may also provide the layer 2 with a rib 19, Fig. 6, to form an abutment for the inner edge of the pad. Instead of making the bottom layer 2 conform with the filler and pad as in Figs. 2 and 5, I may make it flat as shown at 20 in Fig. 7, to be conformed with the filler and pad under the pressure employed in sealing the joint. In Figs. 8, 9 and 10 I have shown forms corresponding substantially with Figs. 5, 6 and 7 except that the port openings in the heat-resisting intermediate layer 22 are made larger and the pad 23 is made thicker to complete the intermediate layer. Instead of putting the pad 10 on the under side of the layer 3 as shown and described, I may reverse the position of the pad and put it on the upper side of the layer 3 as will be readily understood; and instead of arranging the pad 23 to form a projection on the bottom of the gasket as shown in Figs. 8 and 9, I may arrange it to form a projection on the top of the gasket as shown in Fig. 10. I have shown the pad 10 as embedded in the layer 3 in Figs. 2, 5, 6 and 7 and this involves some compression of that part of the layer 3 engaged by the pad, but it is not necessary to embed the pad in the layer 3 as shown at 10', Fig. 2a. The layer 3 of heat-resisting material will ordinarily be made of millboard. The intermediate or filler layer may be made thicker at the marginal edges about the port openings, as shown at 25 in Fig. 11, by compressing the layer except at said marginal edges.

In Fig. 12 I have shown a manifold gasket 27 provided with a skeleton pad 28 about the marginal edges of the port openings 29 or otherwise made in accordance with my invention as hereinbefore described.

My invention provides a gasket which is more dense in use about the port openings than elsewhere and this reenforces and strengthens the gasket to protect it against engine pressures and other conditions of use. With my invention the tension of the joint bolts is applied principally to the marginal edges of the gasket about the port openings instead of being more or less uniformly distributed over the entire gasket and this enables a tight seal to be obtained with less strain on the bolts and also takes care of any unevenness in the faces of the joint. The marginal edges of the intermediate or filler layer and of the complete gasket are reenforced by my invention to resist engine pressures and other conditions of use.

While I have shown and described the invention in a number of different forms and applied to several different type of gaskets, I do not intend to limit the invention thereto but have referred to them as illustrative of the invention; and I reserve the right to make any changes in the form, construction and arrangement of parts as may be necessary or desirable to adapt the invention to other gaskets or for other purposes.

I claim:

1. A gasket comprising a layer of gasket material and having an opening therein, and a pad on the marginal edge of said layer about said opening and embedded in said layer and providing a portion of greater thickness than the other portions of said layer and adapted to resist clamping pressure applied to the gasket to effect a tight seal about said opening.

2. A gasket comprising a layer of gasket material and having a plurality of openings therein, and a plurality of pads at the marginal edges of the layer about said openings, said pads being connected in skeleton formation.

3. A gasket comprising an inner layer of gasket material and an outer metal layer on one side thereof, said gasket having an opening therein, and a pad of material similar to that of the gasket material layer interposed between said gasket material layer and the metal layer at the marginal edge of the gasket about said opening and cooperating with said gasket material layer to provide a portion about said opening of greater thickness than the other portions of said gasket material layer.

4. A gasket having an opening therein and comprising a layer of gasket material and a metal layer on one side thereof, said metal layer having a recess at the marginal edge of the gasket about said opening, and a pad of gasket material seated in said recess.

5. A gasket having an opening therein and comprising a metal layer and a flange extending through said opening, a layer of gasket material on said metal layer, and a pad of gasket material arranged upon said metal layer and embedded in said layer of gasket material adjacent said flange and cooperating with said gasket material layer to provide a portion about said opening of greater thickness than the other portions of said gasket material layer.

6. A gasket having an opening therein and comprising a metal layer and a flange extending through said opening, a rib on said metal layer inwardly of said flange, a layer of gasket material on said metal layer, and a pad of gasket material embedded in said layer of gasket material arranged between said flange and said rib and cooperating with said gasket material layer to provide a portion about said opening of greater thickness than the other portions of said gasket material layer.

7. A gasket having openings therein and comprising a metal layer having flanges thereon extending through said openings, a layer of gasket material on said metal layer, pads of gasket material embedded in said layer of gasket material and arranged on said metal layer about the edges of said openings and adjacent said flanges, and said pads benig connected in skeleton formation.

EDWIN A. SUTCLIFFE.